United States Patent

Hisano

[11] Patent Number: 5,907,897
[45] Date of Patent: *Jun. 1, 1999

[54] METHOD OF MANUFACTURING MOTOR VEHICLE DOOR

[75] Inventor: Masaya Hisano, Saitama-ken, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/617,056

[22] Filed: Mar. 18, 1996

[30] Foreign Application Priority Data

Apr. 11, 1995 [JP] Japan .................................. 7-085543

[51] Int. Cl.⁶ .................................................. B23P 11/00
[52] U.S. Cl. .......................... 29/434; 29/469; 296/146.2; 49/502
[58] Field of Search .......................... 49/502; 296/146.2, 296/146.5; 29/434, 469, 525.11

[56] References Cited

U.S. PATENT DOCUMENTS

| 4,606,148 | 8/1986 | Gandini ..................................... 49/502 |
| 4,793,099 | 12/1988 | Friese et al. . |
| 4,924,630 | 5/1990 | Lomasney et al. ....................... 49/502 |
| 4,984,389 | 1/1991 | Benoit et al. ............................. 49/502 |
| 5,086,589 | 2/1992 | dibenedetto .............................. 49/502 |
| 5,174,066 | 12/1992 | Dupuy ..................................... 49/502 |
| 5,308,138 | 5/1994 | Hlavaty .................................... 49/502 |
| 5,355,629 | 10/1994 | Kimura et al. ........................... 49/502 |
| 5,379,553 | 1/1995 | Kimura et al. . |
| 5,505,024 | 4/1996 | DeRees et al. ...................... 296/146.2 |

FOREIGN PATENT DOCUMENTS

| 286 923 | 10/1988 | European Pat. Off. . |
| 579 535 | 1/1994 | European Pat. Off. . |
| 2618388 | 1/1989 | France ..................................... 49/502 |
| 2698047 | 5/1994 | France ............................... 296/146.2 |
| 3907175 | 8/1990 | Germany ................................. 49/502 |
| A-60-12334 | 1/1985 | Japan . |
| 27084 | 1/1990 | Japan ...................................... 49/502 |
| 2068306 | 8/1981 | United Kingdom ..................... 49/502 |
| 2191156 | 12/1987 | United Kingdom ..................... 49/502 |

*Primary Examiner*—David P. Bryant
*Attorney, Agent, or Firm*—Armstrong, Westerman, Hattori, McLeland & Naughton

[57] ABSTRACT

A motor vehicle door is made in the following way. A door main body is assembled by connecting an inner panel to a door panel. A window pane assembly is assembled by mounting into a guide frame a window pane and a power transmission mechanism for vertically moving the window pane. This guide frame is made by integrating an upper sash and a pair of front and rear lower sashes. The window pane assembly is inserted into the door main body through an upper edge opening portion of the door main body. The window pane assembly is fixed to the door main body in a condition in which the upper sash is positioned in a top of the door main body.

3 Claims, 2 Drawing Sheets

METHOD OF MANUFACTURING MOTOR VEHICLE DOOR

BACKGROUND OF THE INVENTION

1. Field of the Invention

The present invention relates to a method of manufacturing a motor vehicle door.

2. Description of the Related Art

Conventionally, the following steps are employed in manufacturing a motor vehicle door. Namely, an upper sash and an inner panel are connected to a door panel to thereby assemble a door main body. Then, a pair of front and rear lower sashes are mounted on an inside of the door main body and, subsequently, a window pane (glass) is inserted into the door main body through an opening on an upper end of the door main body in a condition in which the window pane is engaged with the lower sashes. Thereafter, a power transmission mechanism for vertically moving the window pane such as a regulator or the like is mounted on an inside of the door main body through a service opening which is formed in the inner panel, to thereby couple the lower edge of the window pane to the power transmission mechanism.

In this method, however, the work of mounting the power transmission mechanism and the work of connecting the power transmission mechanism and the window pane together have to be carried out without visually confirming the positions thereof. Consequent poor workability is, therefore, a hindrance to the improvement in the productivity. Further, there is still something to be desired in point of quality because the condition in which the window pane and the sashes are engaged is difficult of confirmation.

In Japanese Published Unexamined Patent Application No. 12334/1985, there is also known the following method of manufacturing a motor vehicle door. Namely, an opening is formed in a lower edge of a door main body which is provided with an upper sash. A window pane assembly is made by assembling a window pane and a power transmission mechanism for its vertical movement, into a portal (gate-shaped) guide frame which is located on a base plate at the lower end corresponding to the opening. From a bottom side the window pane assembly is inserted into the door main body through the opening. The upper half of the guide frame is projected upwards through an upper edge opening of the door main body to thereby fit it into the upper sash, and the lower edge opening of the door main body is blocked or closed with the base plate to thereby fix the window pane assembly to the door main body.

In the above-described latter prior art, since the window pane assembly is assembled in advance, the work of mounting the power transmission mechanism and the work of connecting this mechanism to the window pane need not be carried out without visually confirming the actual positions thereof. The workability is therefore improved.

By the way, the upper half of the guide frame has a similar function as the upper sash in point of guiding the window pane. However, since the upper half is projected upwards through the door main body when the window pane assembly is mounted on the door main body, it is likely to be subject to scratches. In order to keep the scratches out of sight, there arises a necessity of providing the upper sash into which the upper half of the guide frame is fitted. In this manner, in the above-described latter prior art, since the upper sash is additionally required aside from the guide frame, there is a disadvantage in that the number of parts increases with a consequent increase in the cost and the weight. Further, since the opening must be formed also in the lower edge of the door main body, there is another disadvantage in that the strength of the door main body decreases.

SUMMARY OF THE INVENTION

In view of the above-described disadvantages, the present invention has an object of providing a method of manufacturing a motor vehicle door in which the door can be assembled with a good workability without giving rise to disadvantages such as an increase in the number of parts and a decrease in the strength of the door main body.

In order to attain the above object, the present invention is a method of manufacturing a motor vehicle door comprising the steps of: assembling a door main body by connecting an inner panel to a door panel; assembling a window pane assembly by mounting into a guide frame a window pane and a power transmission mechanism for vertically moving the window pane, the guide frame being made by integrating an upper sash and a pair of front and rear lower sashes; and inserting the window pane assembly into the door main body through an upper edge opening portion in the door main body to thereby fix the window pane assembly to the door main body in a condition in which the upper sash is positioned in a top of the door main body.

Since the work of mounting the power transmission mechanism and the work of coupling this mechanism to the window pane can be carried out in the step of assembling the window pane assembly. Therefore, these works need not be carried out inside the door main body without visually confirming the actual positions thereof. The workability and the quality can thus be improved.

Furthermore, since the window pane assembly is inserted into the door main body through the upper edge opening portion which is originally formed in the door main body for inserting thereinto a window pane, it is not necessary to provide, in the lower edge of the door main body, an opening exclusively for use in inserting therethrough the window pane assembly. The strength of the door main body does not decrease. Further, since that upper portion of the guide frame which forms the framework of the window pane assembly need not be inserted into the upper edge opening portion of the door main body, the possibility of giving rise to scratches can be prevented. As a consequence, it is not necessary to provide an upper sash, aside from the guide frame, to keep the scratches out of sight. The number of parts can therefore be reduced.

By the way, if the lower half portion of the guide frame is constituted only by lower sashes which are separated from each other in the front and rear direction, the distance between the front and the rear lower sashes may become wider during transportation thereof. As a consequence, the window pane becomes easier to get out of position off the guide frame, resulting in a more difficult handling of the window pane assembly. In this case, if the guide frame is formed into a loop shape comprising a cross member which extends between the lower edges of the pair of front and rear lower sashes, there is no possibility that the distance between the front and rear lower sashes becomes wider. The rigidity of the guide frame can thus be secured and the handling of the window glass assembly becomes easy.

Further, it is also considered to connect the upper sash, the lower sashes and the cross member together by means of welding or the like. However, if the guide frame is constituted by an integrally formed product of resin, the number of parts can advantageously be further reduced.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1A:
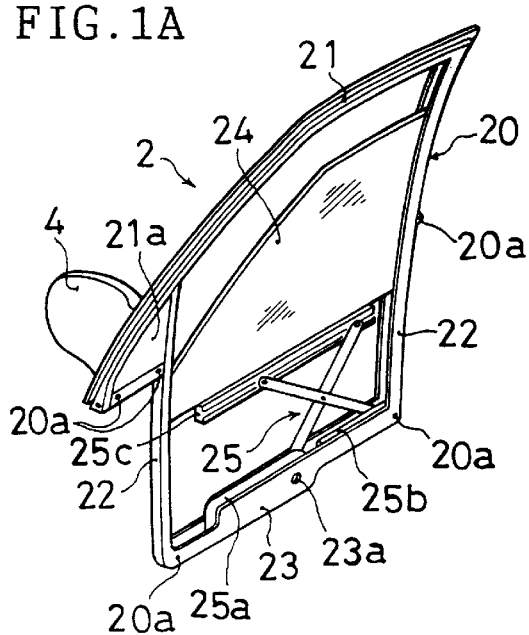
FIGS. 1A, 1B and 1C are a perspective view of one example of a window pane assembly, a perspective view of one example of a door main body and a perspective view in which the window pane assembly is assembled into the door main body, respectively.
Figure 1B:
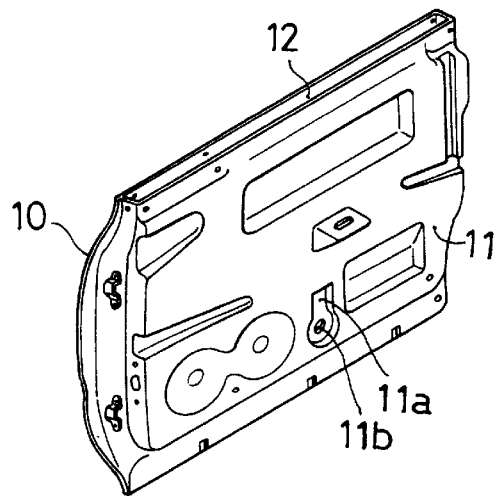
Figure 1C:
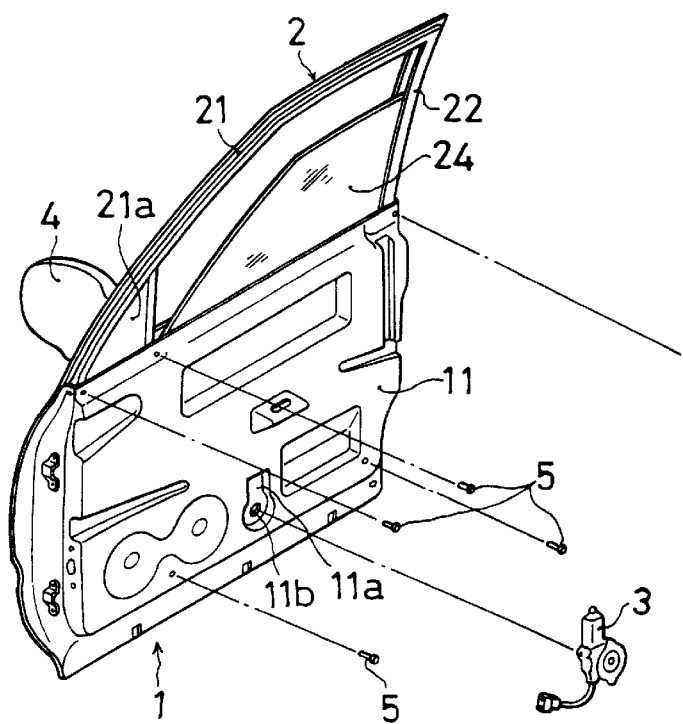

With reference to FIGS. 1A, 1B and 1C, numeral 1 denotes a door main body of a motor vehicle door and numeral 2 denotes a window pane (glass) assembly. The door main body 1 is made up, as shown in FIG. 1B, of a door panel 10 and an inner panel 11 which is connected to an inner side of the door panel 10 by hemming or the like, thereby forming a box shape with both front and rear ends as well as a lower edge closed. On an upper edge thereof, there is provided an opening portion 12 for inserting thereinto a window pane.

The window pane assembly 2 is provided, as shown in FIG. 1A, with a loop-shaped guide frame 20 which is formed by integrally connecting an upper sash 21, a pair of front and rear lower sashes 22, 22, and a cross member 23 which extends between the lower edges of the lower sashes. A window pane 24 and a power transmission mechanism 25 for vertically moving the window pane are assembled into the guide frame 20 to thereby form the window pane assembly 2.

In the present embodiment, the power transmission mechanism 25 is made up of an X-link type of regulator. A driving portion 25a for raising and lowering one of the link members which constitute the X-link, and a guide member 25b for guiding the other of the link members are screwed to the cross member 23. The lower edge of the window pane 24 is coupled to an elevating frame 25c with which upper edges of both the link members are slidably engaged. When an electric motor 3 for a power window is mounted, after the assembly of the door, into a recessed portion 11a formed in the inner panel 11 (see FIG. 1C), an output shaft of the electric motor 3 is connected to an input shaft of the driving portion 25a through a penetrating hole 11b in the recessed portion 11a and a penetrating hole 23a formed in the cross member 23. By operating the electric motor 3 the window pane 24 is vertically moved via the power transmission mechanism 25.

Figure 2:
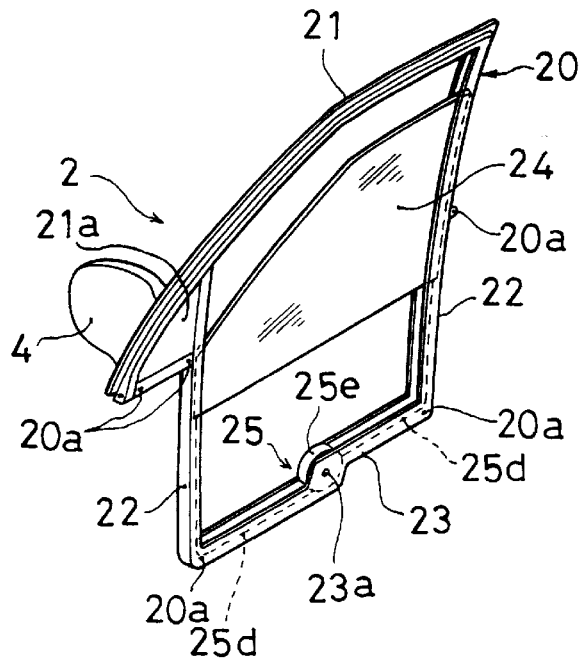
FIG. 2 is a perspective view of another example of the window pane assembly.
Figure 3:
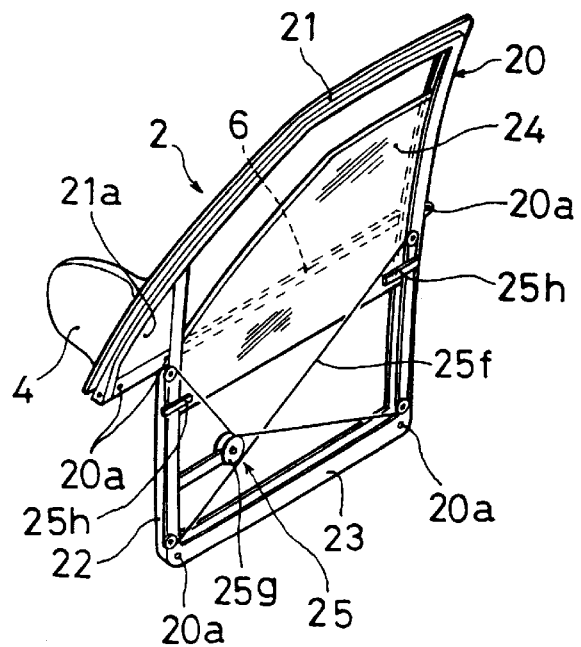
FIG. 3 is a perspective view of still another example of the window pane assembly.

The power transmission mechanism 25 is not limited to the X-link type of regulator. It may of course be of a cable-type of mechanism which comprises, as shown in FIG. 2, a pair of front and rear push-pull type of cables 25d, 25d and a driving portion 25e for pushing and pulling these cables. Further, as shown in FIG. 3, the following arrangement may also be employed. Namely, a wire 25f is wound to extend in the shape of a figure X. By rotating in one and the opposite directions a driving portion 25g which comprises a pulley around which the wire 25f is wound, the window pane 24 is vertically moved via coupling pieces 25h which are attached to the wire 25f.

In the embodiment shown in FIG. 3, an outer mole 6, which is conventionally mounted at a last assembly stage of the door, is mounted in advance on the guide frame 20.

Further, in the above-described embodiments, the following arrangement has also been made. Namely, the guide frame 20 is formed into an integrally formed product of resin, and glass runs, subseals, and garnishes or the like are integrally formed so that the number of parts can further be decreased. In addition, a mounting base 21a for a door mirror 4 is integrally formed in a lower front end of the upper sash 21 so that the upper sash 21 and the door mirror 4 can be painted at the same time in a condition in which the door mirror 4 is mounted in position.

In manufacturing the motor vehicle door, the door main body 1 and the window pane assembly 2 are separately assembled first. Then, through the upper edge opening portion 12 of the door main body 1 the window glass assembly 2 is inserted into the door main body 1 as shown in FIG. 1C until the lower edge portion of the upper sash 21 gets fitted with the opening portion 12. Then, by using screws 5 to be fitted into screw holes 20a formed in the lower edge of the upper sash 21 and the lower edge of the lower sash 22, the window pane assembly 2 is fixed to the door main body 1. After having assembled the above-described electric motor 3 and various outfits or parts such as a door lock mechanism or the like (not illustrated), a door lining (not illustrated) is attached to the inner panel 11.

As can be seen from the above explanations, according to the present invention, the work of mounting the power transmission mechanism and the work of coupling this mechanism to the window pane can be carried out in the step of assembling the window pane. Therefore, the workability and the quality are improved. Furthermore, it becomes possible to form the upper sash integrally with the guide frame of the window pane assembly. The cost can therefore be reduced with the decrease in the number of parts. In addition, since it is not necessary to provide the door main body with an opening for a particular purpose of inserting therethrough the window pane assembly, the strength of the door main body can be secured.

It is readily apparent that the above-described method of manufacturing a motor vehicle door meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing a motor vehicle door comprising the steps of:

assembling a door main body by connecting an inner door panel to an outer door panel;

assembling a window pane assembly by mounting, into a guide frame, a window pane having a power transmission mechanism for vertically moving said window pane in said guide frame, said guide frame being formed by integrating an upper sash and a pair of front and rear lower sashes having inwardly and opposingly facing channels for receiving the marginal edges of said window pane for said vertical movement therein; and inserting said window pane assembly downwardly into said door main body through an upper edge opening in said door main body to assemble said window pane assembly to said door main body in a condition in which said upper sash is positioned above a top of said door main body and fixing said window pane assembly to said door main body by fitting and tightening screws through screw holes in the inner door panel and into mating screw holes formed in a lower edge of the upper sash and by fitting and tightening screws through screw holes formed in said inner door panel adjacent the bottom edge of said inner door panel and into mating screw holes formed adjacent bottom ends of said front and rear lower sashes in opposite ends of a cross member interconnecting said front and rear lower sashes.

2. A method of manufacturing a motor vehicle door according to claim 1, wherein said guide frame is formed into a loop shape with the cross member interconnecting and extending between the bottom ends of the pair of front and rear lower sashes.

3. A method of manufacturing a motor vehicle door according to claim 1 or 2, wherein said guide frame is an integrally formed resin product.

* * * * *